(12) United States Patent
Lin et al.

(10) Patent No.: US 10,788,690 B2
(45) Date of Patent: Sep. 29, 2020

(54) OPTICAL ISOLATOR ARRAY FOR USE IN AN OPTICAL SUBASSEMBLY MODULE

(71) Applicant: Applied Optoelectronics, Inc., Sugar Land, TX (US)

(72) Inventors: Kai-Sheng Lin, Sugar Land, TX (US); Kevin Liu, Houston, TX (US); Ziliang Cai, Richmond, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 105 days.

(21) Appl. No.: 16/257,635

(22) Filed: Jan. 25, 2019

(65) Prior Publication Data

US 2020/0241334 A1 Jul. 30, 2020

(51) Int. Cl.
*G02F 1/01* (2006.01)
*G02F 1/09* (2006.01)

(52) U.S. Cl.
CPC .................. *G02F 1/093* (2013.01)

(58) Field of Classification Search
CPC ..... G02F 1/093; G02F 1/0136; G02B 5/3083; G02B 6/2746; G02B 27/283
USPC .................................................. 359/484.03
See application file for complete search history.

(56) References Cited

U.S. PATENT DOCUMENTS

| 2010/0002988 A1* | 1/2010 | Yoshie | G02B 6/122 |
| | | | 385/14 |
| 2014/0146389 A1* | 5/2014 | Ye | G02F 1/093 |
| | | | 359/484.03 |

* cited by examiner

*Primary Examiner* — William R Alexander
*Assistant Examiner* — Henry A Duong
(74) *Attorney, Agent, or Firm* — Grossman Tucker Perrault & Pfleger, PLLC; Norman S. Kinsella

(57) ABSTRACT

This present disclosure is generally directed to an optical isolator array with a magnetic base that allows for mounting and alignment of N number of optical isolators modules within an optical subassembly module. In an embodiment, the magnetic base provides at least one mounting surface for coupling to N number of optical isolators, with N being equal to an optical channel count for the optical subassembly (e.g., 4-channels, 8-channels, and so on). The magnetic base includes an overall width that allows for a desired number of optical isolators to get mounted thereon. Each optical isolator can be uniformly disposed along the same axis on the magnetic base and at a distance D from adjacent optical isolators. An adhesive such as ultraviolet-curing (UV-curing) optical adhesives may be used to secure each optical isolator at a predefined position and increase overall structural integrity.

19 Claims, 6 Drawing Sheets

OPTICAL ISOLATOR ARRAY FOR USE IN AN OPTICAL SUBASSEMBLY MODULE

TECHNICAL FIELD

The present disclosure relates to optical communications, and more particularly, to an optical isolator array for use in a multi-channel optical subassembly module, the optical isolator array having a magnetic base with a relatively compact and modular profile that supports N number of optical isolators for use in an optical subassembly module.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher transmit/receive speeds in increasingly space-constrained optical transceiver modules has presented significant challenges. Moreover, optical transceiver modules include a wide-range of package profiles with large variations in channel density and housing dimensions, for instance, that can make reusability of components difficult across multiple types of profiles, if not impossible.

For example, some approaches to transmitter optical subassemblies (TOSAs) include having a plurality of laser arrangements including, for example, a laser diode driver (LDD), laser diode, focus lens and multiplexer device, and a multiplexing device for combining channel wavelengths from each of the plurality of laser arrangements in a single housing. Each component of the TOSA must be securely attached and optically aligned with other associated optical components, which presents significant challenges for part designs (e.g., sub-mounts, lenses, mirror holders, and so on) that can be reused between package types, particularly as TOSAs continue to scale. In addition, manufacture of such TOSAs routinely require multiple test, correction, and re-test stages, which can ultimately increase per-unit manufacture time, complexity, and reduce yield.

BRIEF DESCRIPTION OF THE DRAWINGS

These and other features and advantages will be better understood by reading the following detailed description, taken together with the drawings wherein.

DETAILED DESCRIPTION

Figure 1:
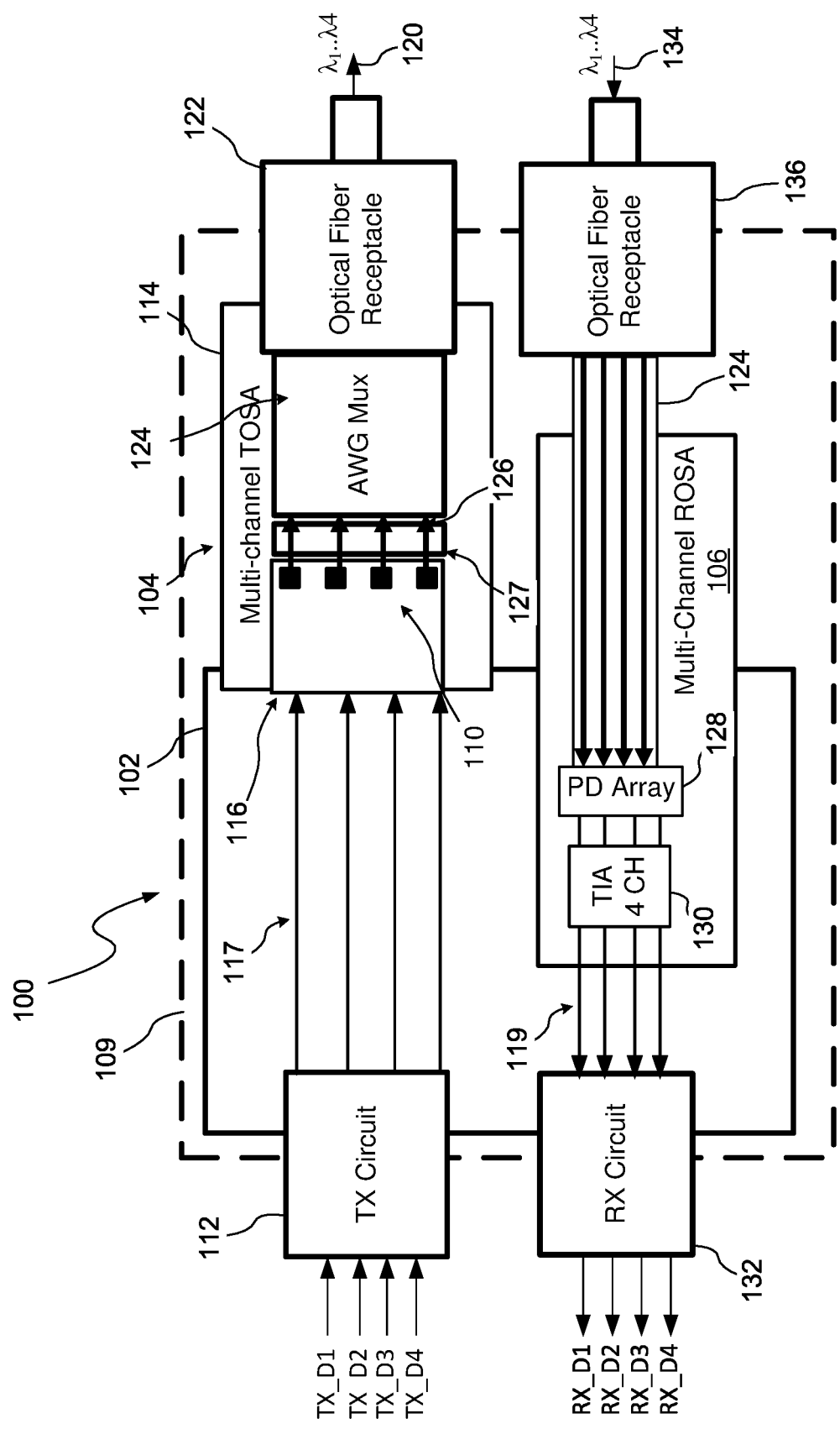
FIG. 1 shows a block diagram of a multi-channel optical transceiver in accordance with an embodiment of the present disclosure.
Figure 2:
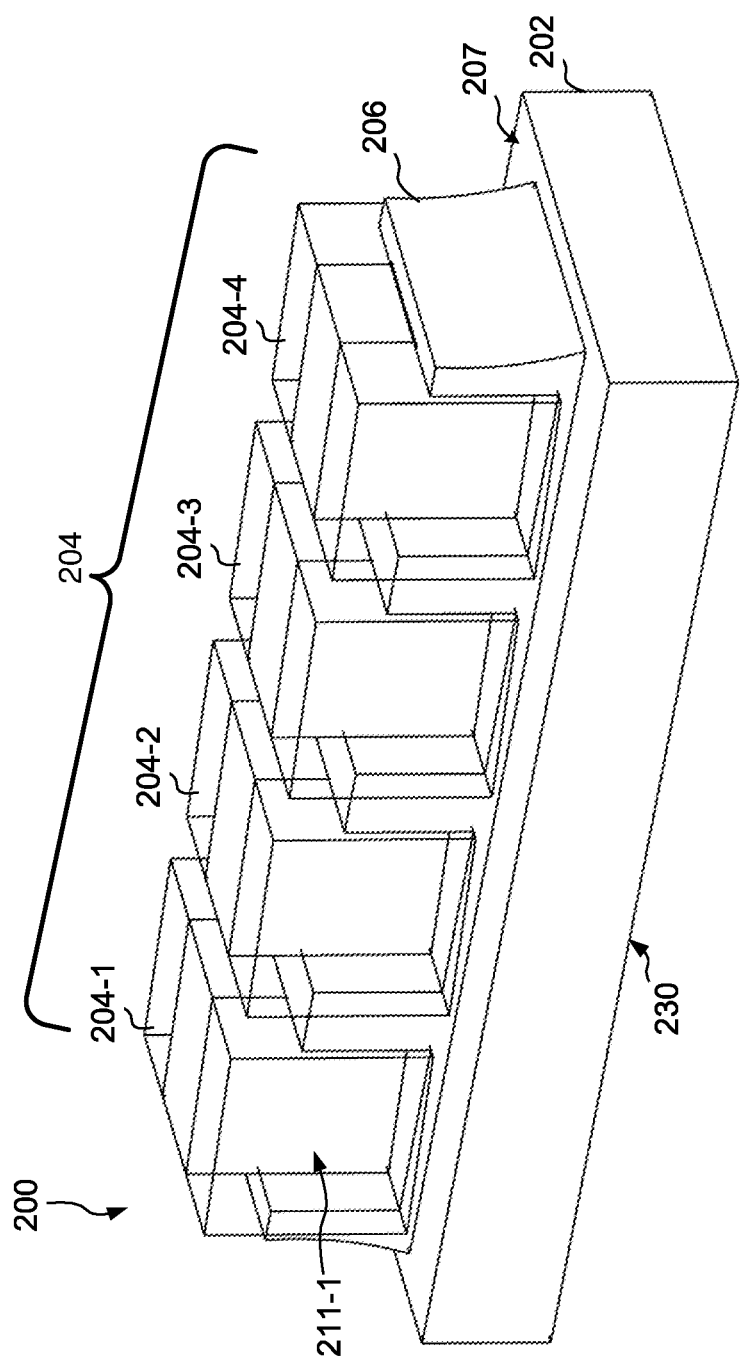
FIG. 2 shows a perspective view of an optical isolator array for use in the optical transceiver of FIG. 1, in accordance with an embodiment of the present disclosure.
Figure 3:
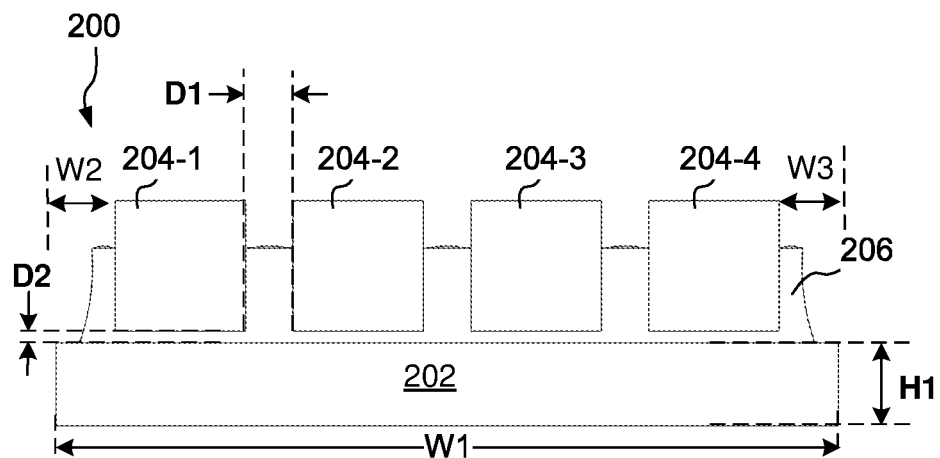
FIG. 3 shows a front view of the optical isolator array of FIG. 2, in accordance with an embodiment of the present disclosure.

This present disclosure is generally directed to an optical isolator array with a magnetic base (or plate) that allows for mounting and alignment of N number of optical isolator chips, referred to herein as simply optical isolators, within an optical subassembly module. In an embodiment, the magnetic base provides at least one mounting surface for supporting and coupling to N number of optical isolators, with N being equal to an optical channel count for the optical subassembly (e.g., 4-channels, 8-channels, and so on). The magnetic base includes an overall width that allows for a desired number of optical isolators to get mounted thereon. Each optical isolator can be disposed along the same axis on the magnetic base and at a uniform distance from adjacent optical isolators. The optical isolators can extend substantially parallel relative to each other when coupled to the magnetic base. Further, each optical isolator provides a light-receiving surface at a first end to receive channel wavelengths from a corresponding laser diode, and a light-emitting surface at a second end, opposite the first end, to pass the received channel wavelengths along a direction of propagation. The polarity and orientation of the magnetic base within the optical subassembly module establishes the direction of propagation through each optical isolator. The magnetic base introduces a magnetic field with a magnetic field strength sufficient to ensure nominal power along the desired direction of propagation. Accordingly, each optical isolator coupled to the magnetic base can pass channel wavelengths along the same direction. In an embodiment, this includes optical isolators passing channel wavelengths along a corresponding light path that extends parallel relative to each other. An adhesive such as ultraviolet-curing (UV-curing) optical adhesives may be used to secure each optical isolator at a predefined position on the magnetic base and provide additional structural support. Other types of adhesives and fixation approaches may be utilized and are within the scope of this disclosure.

In another embodiment of the present disclosure, an optical isolator array is disclosed that includes first and second magnetic bases or plates disposed opposite each other and a plurality of optical isolators sandwiched/disposed therebetween. The optical isolators may be coupled via, for instance, adhesive or other suitable approach to the first and second magnetic bases. The first and second magnetic bases introduce a first and second magnetic field, respectively, and can determine a direction of propagation for the optical isolators based on the same. The magnetic field strength of the first and second magnetic bases may be substantially equal, or different depending on a desired configuration. The addition of a second magnet, and by extension, a second magnetic field, results in greater isolation performance relative to that of a single magnetic field.

Continuing on, each of the first and second magnetic bases may be configured identically, and thus, either magnetic base can be utilized to couple the optical isolator array to the surface of a substrate, e.g., the sidewall of a transmitter optical subassembly (TOSA). In this embodiment, at least one layer of adhesive may extend between the first and second magnetic bases to securely hold the optical isolators in a predetermined position between the first and second magnetic bases and can increase the overall structural integrity of the optical isolator array.

Numerous advantages will be apparent over other approaches that utilize discrete/separate optical isolators coupled to a substrate. For example, an optical isolator array consistent with the present disclosure can be easily be shortened or lengthened to accommodate different optical subassembly housing/packaging requirements and/or when less or more optical channels are desired. The total number of optical isolators may vary according to desired channel counts, and such modifications are achievable without substantial redesign of the optical isolator array. Alternatively, or in addition, the distance/pitch between adjacent optical isolator chips may be varied to accommodate a wide-range of package designs.

In addition, an optical isolator array consistent with the present disclosure may be separately manufactured and optionally tested apart from other optical subassembly components, and then subsequently coupled into an associated housing, e.g., a TOSA housing, as a single unit. This advantageously ensures that each of the optical isolators are optically aligned with associated active and/or passive optical components, e.g., multiplexers, laser diodes, and so on, by virtue of the optical isolator array being coupled to the optical subassembly at a predefined position. The orientation of each optical isolator can be uniformly adjusted in tandem at a fine-grain level (e.g., by less than 10 microns) by simply shifting the physical position of the magnetic base relative to associated optical components, thus minimizing or otherwise reducing the overall number adjustments to achieve nominal power. This can significantly reduce manufacturing complexity, error, and the number of fix-and-repeat testing iterations that normally characterizes optical subassembly manufacturing.

While the present disclosure includes examples and scenarios directed specifically to optical isolator arrays being used in a transmitter optical subassembly (TOSA) arrangement, this disclosure is not limited in this regard. For example, an optical isolator consistent with the present disclosure may be utilized to align and mount optical isolators in receiver optical subassembly (ROSA) arrangements.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM.

The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. On the other hand, the term "direct optical coupling" refers to an optical coupling via an optical path between two elements that does not include such intermediate components or devices, e.g., a mirror, waveguide, and so on, or bends/turns along the optical path between two elements.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated/nominal characteristic. To provide one non-limiting numerical example to quantify "substantially," such a modifier is intended to include minor variation that can cause a deviation of up to and including ±5% from a particular stated quality/characteristic unless otherwise provided by the present disclosure.

Referring to the Figures, FIG. 1, an optical transceiver 100, consistent with embodiments of the present disclosure, is shown and described. In this embodiment, the optical transceiver 100 includes a multi-channel transmitter optical subassembly (TOSA) arrangement 104 and a multi-channel receiver optical subassembly (ROSA) arrangement 106 coupled to a substrate 102, which may also be referred to as an optical module substrate. The substrate 102 may comprise, for example, a printed circuit board (PCB) or PCB assembly (PCBA). The substrate 102 may be configured to be "pluggable" for insertion into an optical transceiver cage 109.

In the embodiment shown, the optical transceiver 100 transmits and receives four (4) channels using four different channel wavelengths ($\lambda 1, \lambda 2, \lambda 3, \lambda 4$) via the multi-channel TOSA arrangement 104 and the multi-channel ROSA arrangement 106, respectively, and may be capable of transmission rates of at least about 25 Gbps per channel. In one example, the channel wavelengths $\lambda 1, \lambda 2, \lambda 3, \lambda 4$ may be 1270 nm, 1290 nm, 1310 nm, and 1330 nm, respectively. Other channel wavelengths are within the scope of this disclosure including those associated with local area network (LAN) wavelength division multiplexing (WDM). The optical transceiver 100 may also be capable of transmission distances of 2 km to at least about 10 km. The optical transceiver 100 may be used, for example, in Internet data center applications or fiber to the home (FTTH) applications. Although the following examples and embodiments show and describe a 4-channel optical transceiver, this disclosure is not limited in this regard. For example, the present disclosure is equally applicable to 2, 6, or 8-channel configurations.

In more detail, the multi-channel TOSA arrangement 104 includes a TOSA housing 114 with a plurality of sidewalls that define a cavity (not shown). The cavity includes a plurality of laser arrangements 110, an optical isolator array 127, and a multiplexing device 124 disposed therein. The optical isolator array 127 may be implemented as the optical isolator array 200 of FIGS. 2-6 or the optical isolator array 200' of FIGS. 7-8, which will be discussed in greater detail below. In an any event, each laser arrangement of the plurality of laser arrangements 110 can be configured to transmit optical signals having different associated channel wavelengths. Each laser arrangement may include passive and/or active optical components such as a laser diode (LD), monitor photodiode (MPD), laser diode driver (LDD), and so on. Additional components comprising each laser arrangement include filters, optical isolators, filtering capacitors, and so on.

To drive the plurality of laser arrangements 110, the optical transceiver 100 includes a transmit connecting circuit 112 to provide electrical connections to the plurality of laser arrangements 110 within the housing 114. The transmit connecting circuit 112 may be configured to receive driving signals (e.g., TX_D1 to TX_D4) from, for example, circuitry within the optical transceiver cage 109. The housing 114 may be optionally hermetically sealed to prevent ingress of foreign material, e.g., dust and debris. Therefore, a plurality of transit (TX) traces 117 (or electrically conductive paths) may be patterned on at least one surface of the substrate 102 and are electrically coupled with a feedthrough device 116 of the TOSA housing 114 to bring the transmit connecting circuit 112 into electrical communication with the plurality of laser arrangements 110, and thus, electrically interconnect the transmit connecting circuit 112 with the multi-channel TOSA arrangement 104. The feedthrough device 116 may comprise, for instance, ceramic, metal, or any other suitable material.

In operation, the multi-channel TOSA arrangement 104 may then receive driving signals (e.g., TX_D1 to TX_D4), and in response thereto, generates and launches multiplexed channel wavelengths on to an output waveguide 120 such as a transmit optical fiber. The generated multiplexed channel wavelengths may be combined based on a demultiplexing device 124 such as an arrayed waveguide grating (AWG) that is configured to receive emitted channel wavelengths 126 from the plurality of laser assemblies 110 and output a signal carrying the multiplexed channel wavelengths on to the output waveguide 120 by way of optical fiber receptacle 122.

Continuing on, the multi-channel ROSA arrangement 106 includes a demultiplexing device 124, e.g., an arrayed waveguide grating (AWG), a photodiode (PD) array 128, and an amplification circuitry 130, e.g., a transimpedance amplifier (TIA). An input port of the demultiplexing device 124 may be optically coupled with a receive waveguide 134, e.g., an optical fiber, by way of an optical fiber receptacle 136. An output port of the demultiplexing device 124 may be configured to output separated channel wavelengths on to the PD array 128. The PD array 128 may then output proportional electrical signals to the TIA 130, which then may be amplified and otherwise conditioned. The PD array 128 and the transimpedance amplifier 130 detect and convert optical signals received from the fiber array 133 into electrical data signals (RX_D1 to RX_D4) that are output via the receive connecting circuit 132. In operation, the PD array 128 may then output electrical signals carrying a representation of the received channel wavelengths to a receive connecting circuit 132 by way of conductive traces 119 (which may be referred to as conductive paths).

Referring to FIGS. 2-6, an example optical isolator array 200 is shown consistent with an embodiment of the present disclosure. As shown, the optical isolator array 200 includes a magnetic base 202 (or magnetic plate) and a plurality of optical isolators shown collectively as 204 and individually as 204-1 to 204-4. The magnetic base 202 may be formed from a metal or metal alloy such as iron, nickel, cobalt, or any combination thereof. In an embodiment the magnetic base 202 may be configured as a permanent magnet device, although other types of magnets are within the scope of this disclosure as such electromagnet devices.

A plurality of sidewalls define the magnetic base 202 and provide at least a first mounting surface 207. The first mounting surface 207 can be substantially planar, as shown, although in other embodiments the first mounting surface 207 may not necessarily be flat. The first mounting surface 207 supports the plurality of optical isolators 204. The overall width W1 (See FIG. 3) of the magnetic base 202 may be a function of the desired number of optical isolators. For instance, in the embodiment shown in FIG. 3 the overall width W1 may measure about 100 microns with each of the plurality of optical isolators 204 having a corresponding with of about 20 microns. In this example, 100 microns may be chosen for the overall width W1 to allow for a portion of the overall width W1, namely widths W2 and W3, to provide adhesive overflow regions, with W2 and W3 each measuring equally at about 10 microns. This advantageously provides sufficient mounting space for the four optical isolators as well as surface area to allow each end of the at least one layer of adhesive 206 to flow and cure without overflowing beyond the sides of the magnetic base 202. Thus, the following equation may be used to determine the overall width W1 of the magnetic base 202:

$$W1 = N*Wn + Wn \qquad \text{Equation (1)}$$

with W1 being the overall length, N being the desired number of optical isolators, and Wn being the width of an optical isolator.

On the other hand, the overall height H1 of the magnetic base 202 may be chosen to ensure, for instance, that each optical isolator of the plurality of optical isolators 204 is aligned vertically with an associated laser arrangement along a Z axis, which will be discussed in greater detail below with regard to FIG. 7.

Each of the plurality of optical isolators 204 can comprise polarization-insensitive Faraday Isolators that include multiple segments/portions including a rotator portion sandwiched/disposed between first and second polarization sections. The first and second polarization sections polarizers can comprise birefringent wedges, e.g. made of rutile (TiO2). This configuration is particularly well suited for space constrained housing. Each of the plurality of optical isolators 204 may include segments formed from different materials to target desired channel wavelengths.

The plurality of optical isolators may be secured at a predefined position on the first mounting surface 207 via at least one layer of adhesive 206. As shown, the at least one layer of adhesive 206 may be disposed in a manner that at least partially surrounds each optical isolator of the plurality of optical isolators 204. The at least one layer of adhesive 206 may flow during a depositing process along a direction that is substantially transverse relative to the first mounting surface 207 based on capillary action caused by proximity of each of the plurality of optical isolators 204, or may simply cure as shown based on being disposed between each optical isolator of the plurality of optical isolators 204. In either case, the at least one layer of adhesive 206 can be used as, in a general sense, a submount to hold and/or support each of the plurality of optical isolators at a predefined position relative to the magnetic base 202.

To this end, a method for forming the optical isolator array 200 may include first disposing the at least one layer of adhesive 206 on to the mounting surface 207 of the base followed by disposing each of the plurality of optical isolators 204 at their predefined positions. Notably, the use of adhesives to hold each optical isolator 204-1 to 204-4 in place advantageously allows for relatively simple, fine-grain adjustments to the pitch/distance between optical isolators. As further shown in FIG. 3, each of the plurality of optical isolators 204 may be disposed at predefined positions that include a uniform distance of D1 between adjacent optical isolators. The at least one layer of adhesive 206 may vertically displace each of the plurality of optical isolators 204 by a distance D2. Distance D2 may be uniform across the plurality of optical isolators 204, although variations may be introduced by design and/or by function of how the at least one layer of adhesive 206 cures. Each of the optical isolators may be further disposed parallel with each other in a linear array.

Figure 4:
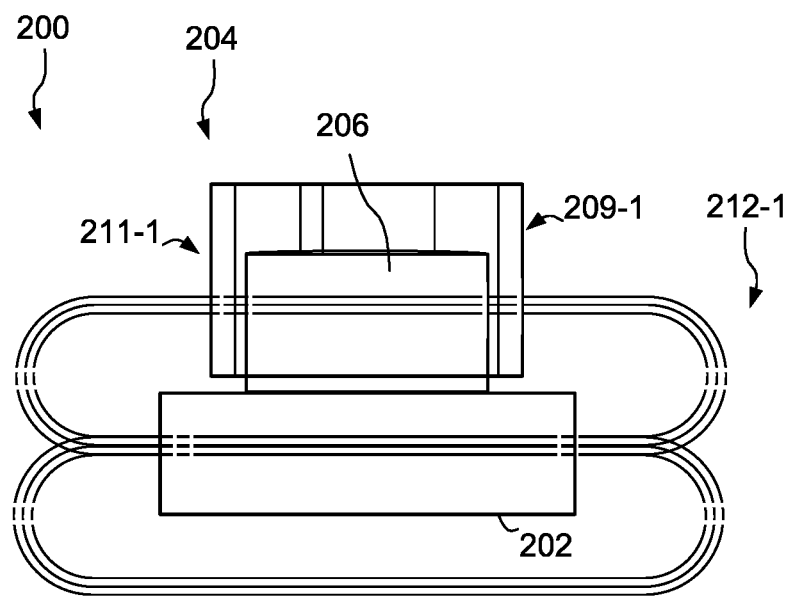
FIG. 4 shows a side view of the optical isolator array of FIG. 2, in accordance with an embodiment of the present disclosure.

With specific reference to FIG. 4, the magnetic base 202 introduces a first magnetic field 212-1. As shown, the flux lines of the first magnetic field 212-1 intersect with each of the optical isolators in the plurality of optical isolators 204 mounted to the magnetic base 202. In operation, the polarity of the first magnetic field 212-2 therefore determines the direction of propagation for light which is incident to the plurality of optical isolators 204.

Figure 5:
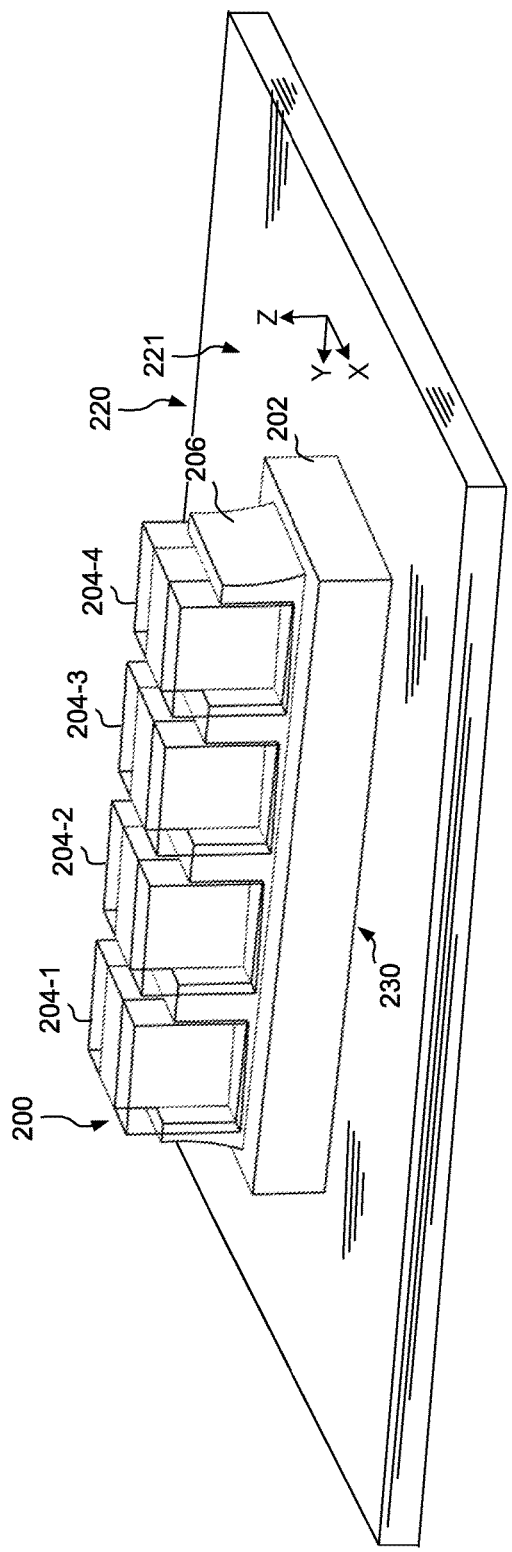
FIG. 5 shows a perspective view of the optical isolator array of FIG. 2 coupled to an optical subassembly substrate, in accordance with an embodiment of the present disclosure.

Turning to FIG. 5, the optical isolator array 200 is shown mounted to a substrate 220. In particular, the magnetic base 202 of the optical isolator array 200 is coupled to the mounting surface 221 provided by the substrate 220 by way of a substrate mating surface 230. The substrate mating surface 230 may be substantially planar and correspond with the mounting surface 221 of a substrate 220.

The substrate 220 may comprise, for example, a printed circuit board (PCB), a sidewall of a housing (e.g., made of metal or other suitably rigid material) or any other suitable material. The optical isolator array 200 may be at least partially assembled separately from other components in an optical subassembly and later coupled during manufacturing processes as effectively, a single piece. Accordingly, each of the plurality of optical isolators 204 may be disposed at a predetermined orientation and position on the magnetic base 202 to ensure that each will be aligned within nominal tolerances along and X and Y axis. Optical alignment of the optical isolator array 200, and more particularly each of the optical isolators mounted thereon, with associated passive and/or active optical components, e.g., a laser diode, may therefore be achieved by simply coupling the optical isolator 200 at a predefined location on the mounting surface 221 of the substrate 220. The overall height H1 (See FIG. 3) may then displace the plurality of optical isolators 200 along the Z axis such that each optical isolator is optically aligned within nominal tolerances of associated active and/or passive components.

Figure 6:
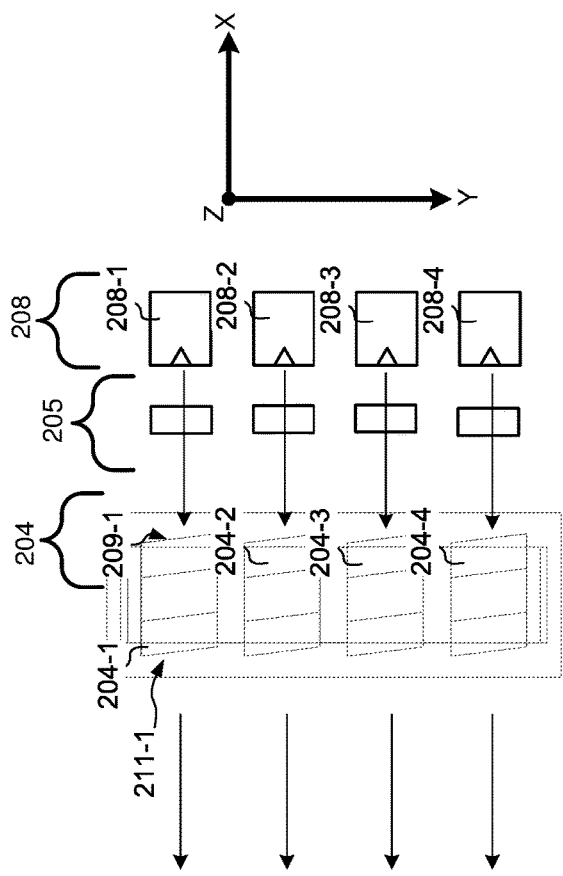
FIG. 6 shows a top-down view of the optical isolator array of FIG. 2 and associated optical components, in accordance with an embodiment of the present disclosure.

For example, and as shown in the highly simplified embodiment of FIG. 6, each of the optical isolators 204-1 to 204-4 may be optically aligned with a corresponding collimating lens of a plurality of collimating lenses 205 and corresponding laser diode 208-1 to 208-4 of the plurality of laser diodes 208 based at least in part on the dimensions of the magnetic base 202. This advantageously allows for the mounting surface 221 of the substrate 220 to act as a stop for the substrate mating surface 230 and provide a positive indication that each of the optical isolators is at a desired position along the Z axis simply by having the substrate mating surface 230 of the magnetic base 202 flush with the mounting surface 221 of the substrate 220. Likewise, alignment for each of the plurality of optical isolators 204 along the X and Y axis requires simply ensuring the magnetic base 202 is positioned at a predetermined X and Y position relative to the associated optical components.

Each of the laser diodes 208-1 to 208-4 may be configured to emit a different channel wavelength. Following the laser diodes 208, each of the optical isolators 204-1 to 204-4 include a light-receiving surface (e.g., light-receiving surface 209-1) for receiving channel wavelengths from a corresponding laser diode of the laser diodes 208-1 to 208-4, and a light-emitting surface (e.g., light-emitting surface 211-1) disposed opposite the light-receiving surface for passing the received channel wavelengths to the multiplexing device, e.g., the multiplexing device 124 (FIG. 1). Each light-receiving and light-emitting surface may be angled, e.g., at about 8 degrees, relative to a corresponding light path, such as shown.

Thus, after coupling of the optical isolator array 200 on the substrate 220, an optical path may then extend from each an emission surface of each of the laser diodes 208-1 to 208-4, through an associated collimating lens of the plurality of collimating lenses 205 and then through the an associated optical isolator of the plurality of optical isolators 204. Each of the light paths may extend substantially parallel to each other, although other embodiments are within the scope of this disclosure.

Figure 7:
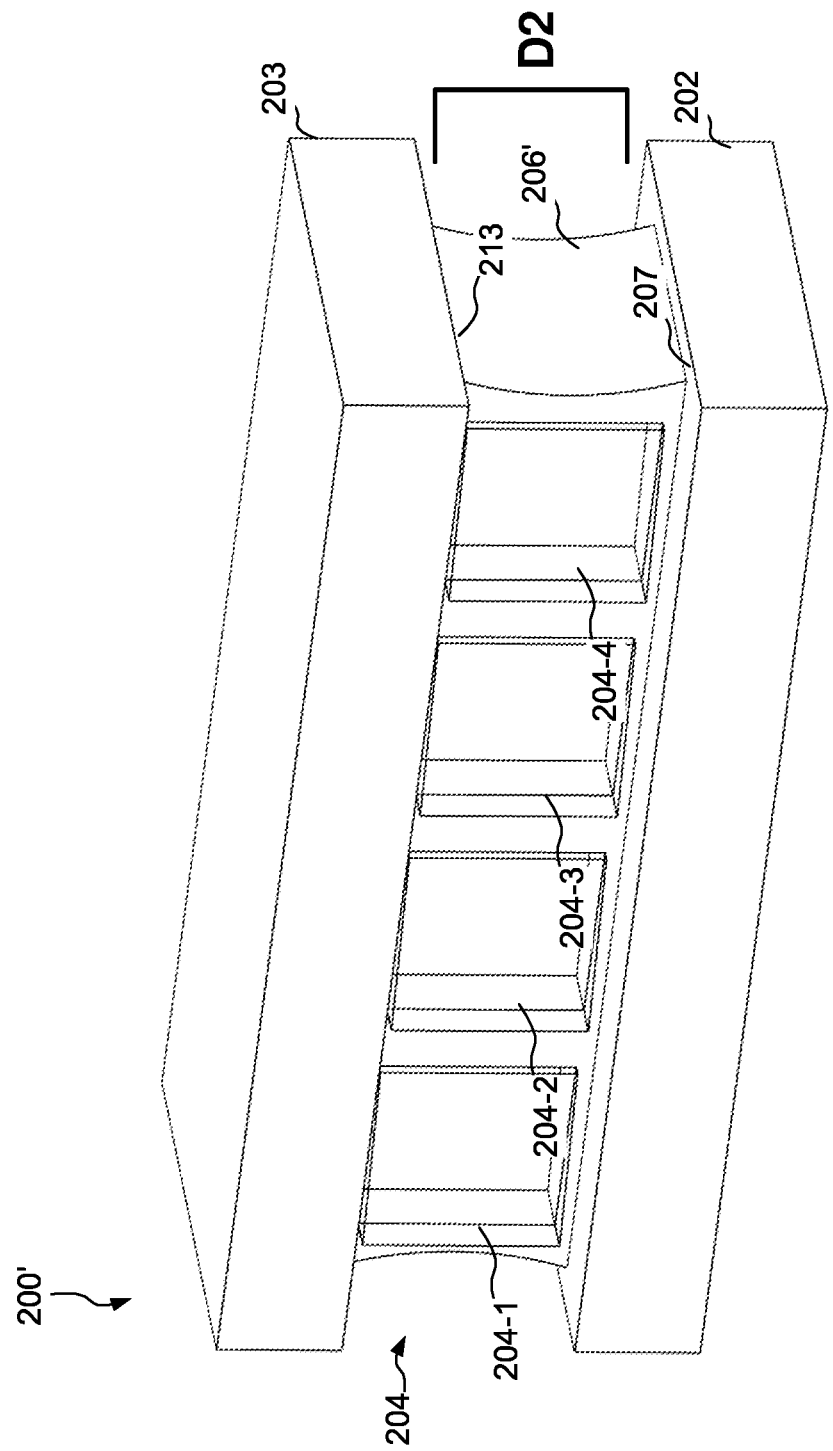
FIG. 7 shows another example optical isolator array suitable for use in the optical transceiver of FIG. 1, in accordance with an embodiment of the present disclosure.

FIG. 7 shows another example optical isolator array 200' in accordance with an embodiment of the present disclosure. As shown, the optical isolator array 200' is substantially similar to the optical isolator array 200 discussed above with regard to FIGS. 2-6, the description of which is equally applicable to the embodiment of FIG. 7 but will not be repeated for brevity. However, the example optical isolator array 200' includes a second magnetic base 203. The second magnetic base 203 may be disposed on an upper surface of the optical isolators 204-1 to 204-4, or alternatively supported by the at least one layer of adhesive 206' disposed between the optical isolators 204 and the second magnetic base 203.

Therefore, the plurality optical isolators 204 and the at least one layer of adhesive 206' can be sandwiched/disposed between the first and second magnetic bases 202, 203. The first and second magnetic bases may extend substantially parallel relative to each other and may have identical dimensions, although other embodiments are within the scope of this disclosure. As shown, the at least one layer of adhesive 206' may extend a distance D2 from the mounting surface 207 of the first magnetic base 202 up to a mounting surface 213 of the second magnetic base 203. To this end, the at least one layer of adhesive 206' securely attaches the first and second magnetic bases 202, 203 to each other, and more importantly, securely fixes the optical isolators 204-1 to 204-4 therebetween.

Figure 8:
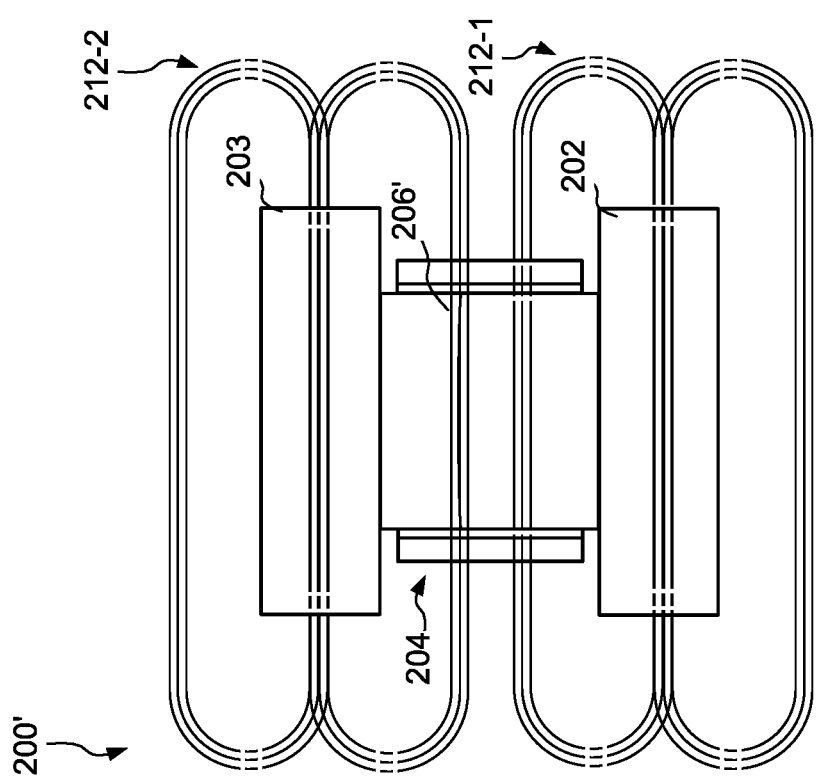
FIG. 8 shows a side view of the example optical isolator array of FIG. 7, in accordance with an embodiment of the present disclosure.

As shown in FIG. 8, the first and second magnetic base 202, 203 introduce first and second magnetic fields 212-1, 212-2, respectively. The first and second magnetic fields 212-1, 212-2 may at least partially overlap, or not, depending on a desired configuration. In either case, the polarity of the first and second magnetic fields 212-1, 212-2 may be utilized to establish a direction of propagation for wavelengths incident to the plurality of optical isolators 204.

In accordance with an aspect of the present disclosure an optical isolator array for use in an optical subassembly module is disclosed. The optical isolator array comprising a first magnetic base defining at least one mounting surface, a plurality of optical isolators mounted to the at least one mounting surface, each of the plurality of optical isolators disposed substantially in parallel relative to each other, and at least one layer of adhesive disposed on the at least one mounting surface to couple the plurality of optical isolators to the first magnetic base and to hold each optical isolator of the plurality of optical isolators at a predefined position relative to each other.

In accordance with another aspect of the present disclosure an optical transceiver is disclosed. The optical transceiver comprising a transceiver housing, at least one optical transmitter subassembly (TOSA) arrangement disposed in the transceiver housing, the at least one TOSA arrangement comprising a substrate defined by at least one mounting surface, a plurality of laser diodes mounted to the at least one mounting surface of the substrate, each laser diode of the plurality of laser diodes to emit a different associated channel wavelength along a corresponding light path of a plurality of light paths, and an optical isolator array mounted to the at least one mounting surface adjacent the plurality of laser diodes such that the plurality of light paths intersect with the optical isolator array, the optical isolator array comprising a at least a first magnetic base and a plurality of optical isolators coupled thereto, and wherein each optical isolator is optically aligned with a corresponding laser diode of the plurality of laser diodes via a corresponding light path, an optical receiver subassembly (ROSA) disposed in the transceiver housing.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical isolator array for use in an optical subassembly module, the optical isolator array comprising:
    a first magnetic base defining at least one mounting surface;
    a plurality of optical isolators mounted to the at least one mounting surface, each of the plurality of optical isolators disposed substantially in parallel relative to each other; and
    at least one layer of adhesive disposed on the at least one mounting surface to couple the plurality of optical isolators to the first magnetic base and to hold each optical isolator of the plurality of optical isolators at a predefined position relative to each other.

2. The optical isolator array of claim 1, wherein the magnetic base is formed from a permanent magnet.

3. The optical isolator array of claim 1, wherein the magnetic base introduces a first magnetic field that intersects with the plurality of optical isolators to establish a direction of propagation.

4. The optical isolator array of claim 1, wherein each optical isolator of the plurality of optical isolators comprises a Faraday Isolator.

5. The optical isolator array of claim 1, wherein each optical isolator of the plurality of optical isolators includes an angled light-receiving surface to receive channel wavelengths from an associated laser diode.

6. The optical isolator array of claim 1, wherein the plurality of optical isolators is disposed uniformly across the at least one mounting surface.

7. The optical isolator array of claim 1, wherein the at least one layer of adhesive is disposed between adjacent optical isolators of the plurality of optical isolators.

8. The optical isolator array of claim 1, wherein the magnetic base includes a substrate mating surface, and whereby the substrate mating surface is substantially flat to correspond with a mounting surface of a substrate and to mount thereto.

9. The optical isolator array of claim 1, further comprising a second magnetic base, the second magnetic base being coupled to the plurality of optical isolators via the at least one layer of adhesive.

10. The optical isolator array of claim 9, wherein the second magnetic base introduces a second magnetic field, the second magnetic field intersecting with the plurality of optical isolators.

11. An optical transceiver, the optical transceiver comprising:
    a transceiver housing;
    at least one optical transmitter subassembly (TOSA) arrangement disposed in the transceiver housing, the at least one TOSA arrangement comprising:
        a substrate defined by at least one mounting surface;
        a plurality of laser diodes mounted to the at least one mounting surface of the substrate, each laser diode of the plurality of laser diodes to emit a different associated channel wavelength along a corresponding light path of a plurality of light paths; and
        an optical isolator array mounted to the at least one mounting surface adjacent the plurality of laser diodes such that the plurality of light paths intersect with the optical isolator array, the optical isolator array comprising a at least a first magnetic base and a plurality of optical isolators coupled thereto, and wherein each optical isolator is optically aligned with a corresponding laser diode of the plurality of laser diodes via a corresponding light path;
    an optical receiver subassembly (ROSA) disposed in the transceiver housing.

12. The optical transceiver of claim 11, wherein the first magnetic base of the optical isolator array is formed from a permanent magnet.

13. The optical transceiver of claim 11, wherein the first magnetic base introduces a first magnetic field that intersects with the plurality of optical isolators to establish a direction of propagation.

14. The optical transceiver of claim 11, wherein each optical isolator of the plurality of optical isolators includes an angled light-receiving surface to receive channel wavelengths from a corresponding laser diode of the plurality of laser diodes.

15. The optical transceiver of claim 11, wherein the plurality of optical isolators is disposed uniformly across the at least one mounting surface.

16. The optical transceiver of claim 11, wherein at least one layer of adhesive is disposed between adjacent optical isolators of the plurality of optical isolators.

17. The optical transceiver of claim 11, wherein the first magnetic base includes a substrate mating surface, and whereby the substrate mating surface is substantially flat to correspond with the mounting surface of a substrate to mount thereto.

18. The optical transceiver of claim 11, further comprising a second magnetic base, the second magnetic base being coupled to the plurality of optical isolators and the first magnetic base via at least one layer of adhesive.

19. The optical transceiver of claim 18, wherein the second magnetic base introduces a second magnetic field, the second magnetic field intersecting with the plurality of optical isolators.

* * * * *